(12) United States Patent
Collmer et al.

(10) Patent No.: US 10,106,013 B2
(45) Date of Patent: Oct. 23, 2018

(54) HEAT EXCHANGER ARRANGEMENT

(71) Applicant: Eberspächer Climate Control Systems GmbH & Co. KG, Esslingen (DE)

(72) Inventors: Andreas Collmer, Aichwald (DE); Michael Haefner, Stuttgart (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 764 days.

(21) Appl. No.: 14/416,200

(22) PCT Filed: Jun. 12, 2013

(86) PCT No.: PCT/EP2013/062169
§ 371 (c)(1),
(2) Date: Jan. 21, 2015

(87) PCT Pub. No.: WO2013/186268
PCT Pub. Date: Dec. 19, 2013

(65) Prior Publication Data
US 2015/0174988 A1    Jun. 25, 2015

(30) Foreign Application Priority Data

Jun. 13, 2012 (DE) .................. 10 2012 209 894
Aug. 14, 2012 (DE) .................. 10 2012 214 480

(51) Int. Cl.
*F28D 7/10* (2006.01)
*B60H 1/22* (2006.01)
(Continued)

(52) U.S. Cl.
CPC .......... *B60H 1/2209* (2013.01); *F24H 1/009* (2013.01); *F24H 1/263* (2013.01); *F24H 9/0015* (2013.01);
(Continued)

(58) Field of Classification Search
CPC .......... B60H 1/2209; B60H 2001/2271; F24H 1/009; F24H 1/263; F24H 9/0015; F28D 7/008; F28D 7/106
(Continued)

(56) References Cited

U.S. PATENT DOCUMENTS 4,480,172 A * 10/1984 Ciciliot .................. F22B 1/288
165/156
5,983,841 A    11/1999 Haber
(Continued)

FOREIGN PATENT DOCUMENTS

CN         85104503 B     12/1986
CN         101111723 A    1/2008
(Continued)

OTHER PUBLICATIONS

European Examination Report dated Jan. 29, 2016.
German Examination Report dated Apr. 17, 2013.

*Primary Examiner* — Leonardo R Leo
(74) *Attorney, Agent, or Firm* — McGlew and Tuttle, P.C.

(57) ABSTRACT

A heat exchanger assembly for a vehicle heating device includes inner heat exchanger housing (12) and outer heat exchanger housing (14). A fluid flow space (24) is formed between the inner heat exchanger housing and the outer heat exchanger housing. Flow guiding formations (40, 42), along circumferential walls (18, 22) of the housings, divide a portion of the fluid flow space into a first partial flow space (44) and a second partial flow space (46). A fluid inlet opening (49) opens to the first partial flow space and at least one fluid outlet opening (51) opens to the second partial flow space (46). A press fit formation (94) fixes the inner heat exchanger housing in relation to the outer heat exchanger housing and includes the first flow guiding formation and the (Continued)

second flow guiding formation and/or the press fit formation is in an end region (32) of the circumferential walls.

21 Claims, 6 Drawing Sheets

(51) Int. Cl.
- *F24H 1/00* (2006.01)
- *F24H 1/26* (2006.01)
- *F24H 9/00* (2006.01)
- *F28D 7/00* (2006.01)

(52) U.S. Cl.
CPC .... *B60H 2001/2271* (2013.01); *F28D 7/0008* (2013.01); *F28D 7/106* (2013.01)

(58) Field of Classification Search
USPC .................................................. 165/154, 169
See application file for complete search history.

(56) References Cited

U.S. PATENT DOCUMENTS

| | | | |
|---|---|---|---|
| 6,520,248 B2* | 2/2003 | Gailus | ................. H01L 21/4882 |
| | | | 165/185 |
| 8,550,147 B2* | 10/2013 | Lansinger | .......... B60H 1/00271 |
| | | | 165/154 |
| 2005/0235973 A1 | 10/2005 | Husges | |
| 2009/0050302 A1 | 2/2009 | Husges et al. | |

FOREIGN PATENT DOCUMENTS

| | | |
|---|---|---|
| CN | 102062029 A | 5/2011 |
| DE | 101 43 479 C1 | 1/2003 |
| DE | 10143479 C1 * | 1/2003 ........... B60H 1/2209 |
| DE | 10 2004 019 554 A1 | 11/2005 |
| DE | 10 2005 058204 A1 | 6/2007 |
| DE | 102006031606 A | 1/2008 |
| DE | 10 2009 043 264 A1 | 3/2011 |
| DE | 10 2009 046781 A1 | 5/2011 |
| EP | 1 906 130 A2 | 4/2008 |
| EP | 1 935 685 A2 | 6/2008 |

\* cited by examiner

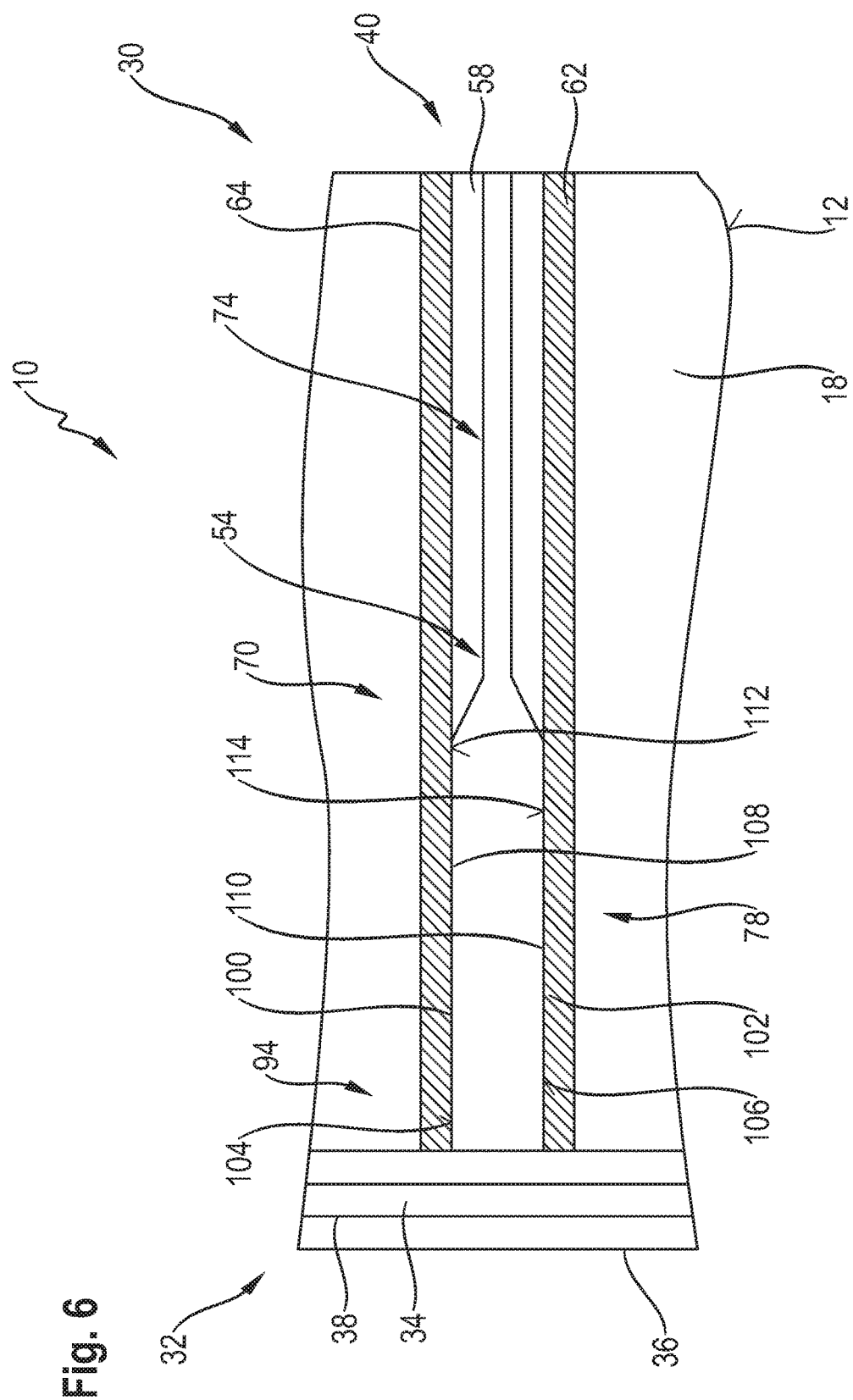

HEAT EXCHANGER ARRANGEMENT

CROSS REFERENCE TO RELATED APPLICATIONS

This application is a United States National Phase Application of International Application PCT/EP2013/062169 filed Jun. 12, 2013 and claims the benefit of priority under 35 U.S.C. § 119 of German Patent Applications DE 10 2012 209 894.1 filed Jun. 13, 2012 and DE 10 2012 214 480.3 filed Aug. 14, 2012, the entire contents of which are incorporated herein by reference.

FIELD OF THE INVENTION

The present invention pertains to a heat exchanger arrangement, especially for a vehicle heater, comprising:
- a pot-like inner heat exchanger housing with a first bottom wall and with a first circumferential wall adjoining the first bottom wall and surrounding a longitudinal axis,
- a pot-like outer heat exchanger housing with a second bottom wall and with a second circumferential wall adjoining the second bottom wall and surrounding the longitudinal axis,
- a fluid flow space formed between the inner heat exchanger housing and the outer heat exchanger housing,
- a first fluid guiding formation extending essentially in the direction of the longitudinal axis along the first circumferential wall and the second circumferential wall and a second flow guiding formation extending essentially in the direction of the longitudinal axis along the first circumferential wall and the second circumferential wall at a circumferentially spaced location from the first flow guiding formation, wherein the first flow guiding formation and the second flow guiding formation divide the part of the fluid flow space formed between the first circumferential wall and the second circumferential wall into a first partial flow space and a second partial flow space,
- at least one fluid inlet opening open towards the first partial flow space and at least one fluid outlet opening open towards the second partial flow space, and
- a press fit formation for fixing the inner heat exchanger housing in relation to the outer heat exchanger housing.

BACKGROUND OF THE INVENTION

Such a heat exchanger housing with two pot-like (pot-shaped) heat exchanger housings inserted one into the other is known from DE 101 43 479 C1. The fluid flow space enclosed between these is divided by two flow guiding formations arranged at circumferentially spaced locations from one another into two partial flow spaces, so that the fluid being fed via an inlet opening enters one of the partial flow spaces, reaches the area of the fluid flow space formed between the two bottom walls there and can then flow into the second partial flow space and via this to the outlet opening. Axially limited webs are provided in the circumferential direction between the flow guiding formations at the inner heat exchanger housing in the area in which the circumferential walls adjoin the bottom walls of the respective heat exchanger housing, and said webs are pressed to come into contact with web-like heat exchanger projections located opposite in the area in which the circumferential wall of the outer heat exchanger housing adjoins the bottom wall of the outer heat exchanger housing and thus they form a press fit formation, by which the two heat exchanger housings are held rigidly on one another, in the area in which the circumferential walls adjoin the bottom walls. As a result, the two heat exchanger housings are in direct heat transfer contact in the area of these press fit formations, so that the surface of the heat exchanger arrangement that can be efficiently used for the heat transfer can be enlarged.

SUMMARY OF THE INVENTION

An object of the present invention is to provide a heat exchanger arrangement, especially for a vehicle heater, which guarantees improved heat transfer capacity and can be mounted in a simplified manner at the same time.

This object is accomplished according to the present invention by a heat exchanger arrangement, especially for a vehicle heater comprising:
- a pot-shaped inner heat exchanger housing with a first bottom wall and with a first circumferential wall adjoining the first bottom wall and surrounding the longitudinal axis,
- a pot-shaped outer heat exchanger housing with a second bottom wall and with a second circumferential wall adjoining the second bottom wall and surrounding the longitudinal axis,
- a fluid flow space formed between the inner heat exchanger housing and the outer heat exchanger housing,
- a first flow guiding formation extending essentially in the direction of the longitudinal axis along the first circumferential wall and the second circumferential wall and a second flow guiding formation extending essentially in the direction of the longitudinal axis along the first circumferential wall and the second circumferential wall, wherein the first flow guiding formation and the second flow guiding formation divide the part of the fluid flow space formed between the first circumferential wall and the second circumferential wall into a first partial flow space and a second partial flow space,
- at least one fluid inlet opening open towards the first partial flow space and at least one fluid outlet opening open towards the second partial flow space, and
- a press fit formation for fixing the inner heat exchanger housing in relation to the outer heat exchanger housing.

Provisions are, furthermore, made for the press fit formation to comprise the first flow guiding formation and the second flow guiding formation or/and for the press fit formation to be provided in an end area of the circumferential walls located at a distance from the first bottom wall and the second bottom wall.

Two aspects may be provided in the heat exchanger arrangement according to the present invention individually, but, of course, also combined. If the flow guiding formations are part of the press fit formation or the press fit formation is provided essentially by the flow guiding formation, it is not necessary to provide any further design measures that make possible a defined positioning and holding of the two heat exchanger housings by generating a press fit. If the press fit formation is not provided, as this is known from the state of the art, in the area in which the circumferential walls adjoin the respective bottom walls of the heat exchanger housings, but in the end area of the circumferential walls, i.e., in the area in which these are located at spaced locations from the bottom walls, it is ensured that, especially in the area in which the two circumferential walls are also to be adjoined to one another tightly, a defined positioning of the two heat exchanger housings in relation to one another is inherently imposed and a sealing formation, which also acts there, can thus be positioned and also held in a defined manner between the two heat exchanger housings without the risk of an excessive local load. If this functionality of the press fit formation is also assumed by the flow guiding formations, no further design measures are necessary on the two heat exchanger housings to make it possible to assume this press fit functionality. As a consequence, the two heat exchanger housings can be designed optimally with respect to other functionalities, especially the flow guiding functionalities or the heat transfer functionalities.

To achieve tight closure of the fluid flow space in the area in which the two heat exchanger housings adjoin each other, it is proposed that the fluid flow space be closed in the end area in a fluid-tight manner by a sealing formation acting between the inner heat exchanger housing and the outer heat exchanger housing.

To generate a sufficiently stable holding function between the two heat exchanger housings, it is proposed that the press fit formation have a length of extension in the direction of the longitudinal axis in the range of 0.2 to 0.6 and preferably about 0.4 of the length of extension of the first circumferential wall in the direction of the longitudinal axis.

To make it possible to achieve a defined flow guiding function that is also secure against leakages with a simple design, it is proposed that at least one and preferably each flow guiding formation comprise on a circumferential wall a first web projecting radially on one circumferential wall from among the first circumferential wall and the second circumferential wall and a recess receiving the first web on the other of the circumferential walls from among the first circumferential wall and the second circumferential wall. To avoid local thin-walled areas of one of the heat exchanger housings, provisions may be made for the recess to be formed between two second webs projecting radially between two second webs projecting radially from the other circumferential wall at circumferentially spaced locations from one another.

The first circumferential wall advantageously provides one circumferential wall and the second circumferential wall the other circumferential wall.

A flow guiding functionality secured against leakage flows with a sealing function in the manner of a labyrinth gland can be achieved in a simple manner by a recess width corresponding essentially to a web width of the first web meshing with same at least in some areas.

The provision of the functionality of the press fit formation by the flow guiding formations can be achieved in a simple manner by the press fit formation comprising, on at least one flow guiding formation, a radially outwardly oriented first press fit surface and a radially inwardly oriented second press fit surface pressed against the first press fit surface.

To merge the functions of the press fit formation and the flow guiding formation, provisions may be made in the above-described design of the flow guiding formations for at least one and preferably each first web with its radially oriented end face to provide one press fit surface from among the first press fit surface and the second press fit surface, and for at least one and preferably each recess with its radially oriented recess bottom surface to provide the other press fit surface from among the first press fit surface and the second press fit surface.

To avoid redundancy in the relative positioning of the two heat exchanger housings in relation to one another, it is proposed that in a length area of the at least one flow guiding formation, which length area adjoins the press fit formation, the end faces of the at least one first web be located at a radially spaced location from the associated recess bottom surface, wherein provisions may advantageously be made for the length area to extend starting from the press fit formation to an area in which the circumferential walls adjoin the bottom walls.

It is proposed in an alternative type of embodiment that the press fit formation on at least one flow guiding formation comprise at least one first press fit surface oriented in a first circumferential direction and at least one second press fit surface that is oriented in a second circumferential direction opposite the first circumferential direction and is pressed against at least one first press fit surface. A radial load of the assembly units, which are to be caused to mesh with one another, i.e., of the two heat exchanger housings, and a compromise of the fluid-tight closure to be established between these, which compromise may possibly be generated hereby during the formation of the press fit, are avoided by providing press fit surfaces oriented in the circumferential direction and pressed against one another. To achieve a merging of the functions in this embodiment variant as well, it is proposed that at least one and preferably each web with its lateral web surfaces oriented in the circumferential direction provide a respective first press fit surface and for at least one and preferably each recess with its lateral recess surfaces oriented in the circumferential direction provide a respective second press fit surface.

To also avoid redundancy of the mutual holding of the two heat exchanger housings in relation to one another in case of a press fit effect generated in the circumferential direction, it is proposed that the lateral web surfaces be located at circumferentially spaced locations from the associated lateral recess surfaces in a length area of the flow guiding formations adjoining the press fit formation, said length area advantageously extending starting from the press fit formation to an area in which the circumferential walls adjoin the bottom walls.

The present invention pertains, furthermore, to a vehicle heater, comprising a burner area to be supplied with combustion air and fuel and a heat exchanger arrangement according to the present invention for transferring combustion heat generated in the burner area to a fluid, preferably liquid, flowing through the fluid flow space.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6 is a partial radial section of the inner heat exchanger housing with second webs associated with a first web in a sectional view.

DESCRIPTION OF THE PREFERRED EMBODIMENTS

Figure 1:
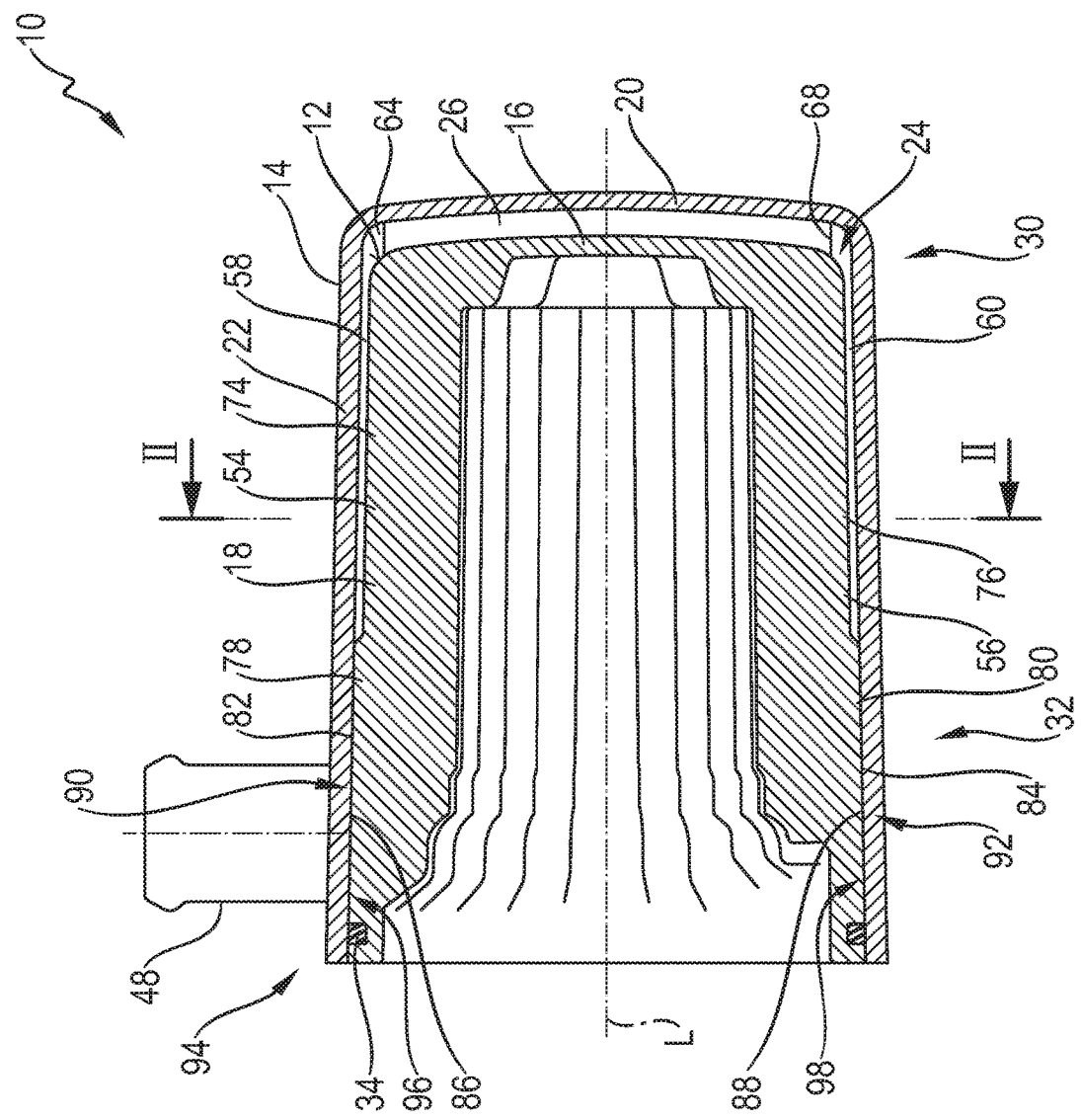
FIG. 1 is a sectional view cut along a longitudinal axis, cut in a plane I-I in FIG. 2, showing a heat exchanger arrangement.

A heat exchanger arrangement, as it can be used, for example, in a fuel-operated vehicle heater in connection with a burner area to be supplied with fuel and combustion air, is generally designated by 10 in the figures. The heat exchanger arrangement 10 comprises a pot-shaped inner heat exchanger housing 12 and a pot-shaped outer heat exchanger housing 14 essentially surrounding this. The inner heat exchanger housing 12 comprises a first bottom wall 16 oriented essentially at right angles to a longitudinal axis L and a first circumferential wall 18 adjoining this and extending surrounding this essentially along the longitudinal axis L. The outer heat exchanger housing 14 likewise comprises a second bottom wall 20 oriented essentially at right angles to the longitudinal axis L and, adjoining this, a second circumferential wall 22 surrounding the longitudinal axis L and extending along this.

The inner heat exchanger housing 12 and the outer heat exchanger housing 14 define between their bottom walls 16, 20 and their circumferential walls 18, 22 a flow guiding space generally designated by 24 for a fluid, for example, a liquid, which is to be heated in the heat exchanger arrangement 10. This flow space 24 comprises a part 26 formed between the two bottom walls 16, 20 and a part 28 formed between the two circumferential walls 18, 22.

Figure 4:
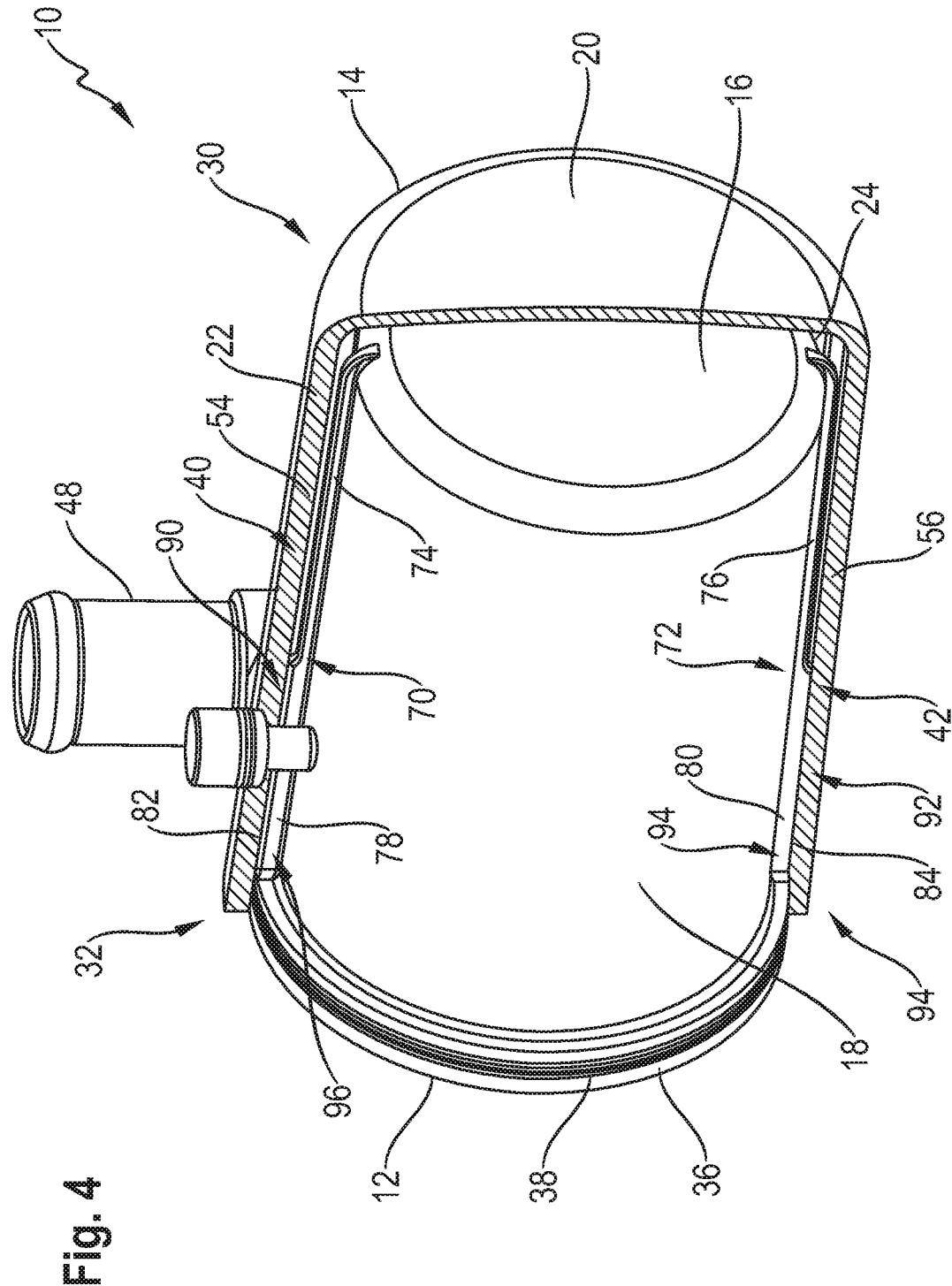
FIG. 4 is a perspective view corresponding to FIG. 3 with an outer heat exchanger housing shown in a longitudinal section.
Figure 5:
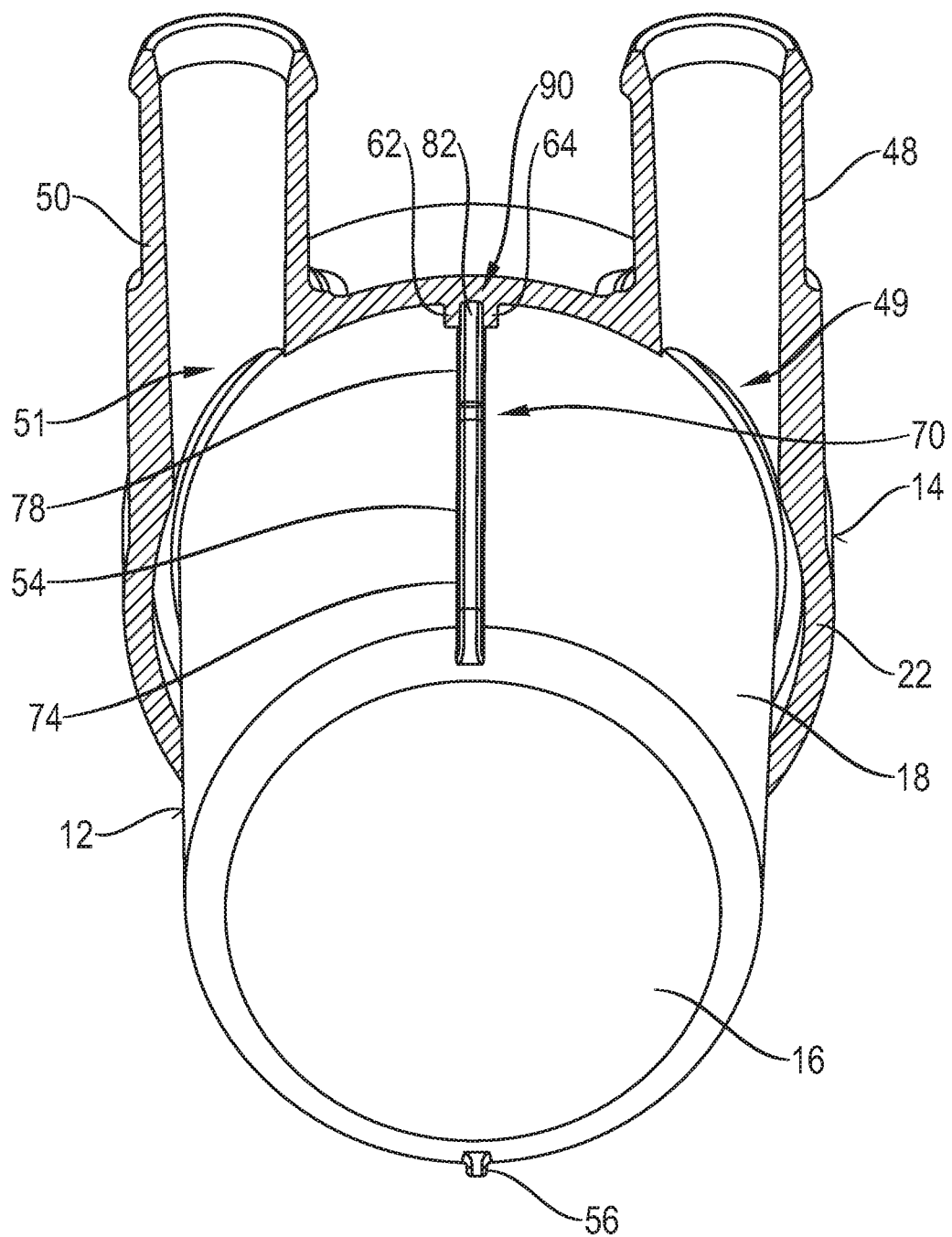
FIG. 5 is a perspective view of the heat exchanger arrangement with an outer heat exchanger housing shown in a cross-sectional view.

In an end area 32 located at a distance from the area 30 in which the circumferential walls 18, 22 adjoin the bottom walls 16, 20, the two heat exchanger housings 12, 14 and the circumferential walls 18, 20 thereof are connected to one another in a fluid-tight manner. A sealing element 34 designed, for example, as an O-ring, which is inserted between the two heat exchanger housings 12, 14, is used for this. As is illustrated in FIG. 4, this may be received in a radially outwardly projecting circumferential collar 36 of the inner heat exchanger housing 12 or in a groove 38 provided in this collar and it can thus be sealingly in contact with an opposite surface of the second circumferential wall 22 of the outer heat exchanger housing 14.

The part 28 of the fluid flow space 24 formed between the two circumferential walls 18, 22 is divided by a first flow guiding formation 40 and a second flow guiding formation 42, which act between the two circumferential walls 18, 22, into a first partial flow space 44 and a second partial flow space 46. These two partial flow spaces 44, 46 join in the adjoining area 30 the part 26 of the fluid flow space 24 formed between the two bottom walls 16, 20. Fluid can be introduced into the first partial flow space 44 via an inlet opening 49 formed in the area of an inlet pipe 48. Guided by the two flow guiding arrangements 40, 42 arranged essentially diametrically opposite each other, for example, in relation to the longitudinal axis L, the fluid thus having entered the fluid flow space 24 flows in the direction of the adjoining area 30 and into the part 26 of the fluid flow space 24. From there it flows into the second partial flow space 46 and flows back in the direction of the end area 32. The fluid heated by thermal interaction with the two heat exchanger housings 12, 14 leaves the fluid flow space 24 through an outlet opening 51 formed in the area of an outlet pipe 50. To make it possible to provide the largest possible interaction surface for this thermal interaction, for example, the inner heat exchanger housing 12 may have a plurality of heat transfer ribs 52, which enlarge the interaction surface with the combustion waste gases flowing into this area, on its inner side facing away from the fluid flow space 24.

The two flow guiding formations 40, 42 advantageously extend essentially in the direction of the longitudinal axis L essentially over the entire length of extension of the circumferential walls 18, 22. It shall be noted in this connected that the circumstance that, for example, the circumferential walls 18, 22 may be formed, in at least some areas, with increasing radial distance from the longitudinal axis L, does not prevent the flow guiding formations 40, 42 from being able to extend along this longitudinal axis L. In particular, it is seen in FIG. 2 that these two flow guiding formations are located in a plane that also contains the longitudinal axis L and corresponds to the section plane of FIG. 1 and are arranged such that they are centered in relation to this plane.

Each of the flow guiding formations 40, 42 comprises on the outer side of the first circumferential wall 18 a radially outwardly projecting first web 54, 56 extending in the direction of the longitudinal axis L. A recess 58, 60 accommodating each first web 54, 56 is associated with each first web 54, 56 on the circumferential wall 22 of the outer heat exchanger housing 14. To avoid locally excessively thin wall areas of the outer heat exchanger housing 14, at least one of these recesses 58, 60 is formed between two second webs 62, 64 and 66, 68, respectively, which project radially inwardly from the circumferential wall 22 and extend essentially in the direction of the longitudinal axis L. To achieve an essentially fluid-tight connection avoiding leakage flows, the circumferential width of the first webs 54, 56 advantageously corresponds approximately to the circumferential distance between the two second webs 62, 64 and 66, 68 receiving a respective first web 54, 56 between them. A sealing functionality in the manner of a labyrinth gland is achieved in this manner between the first webs 54, 56 and the second webs 62, 64, 66, 68.

Figure 2:
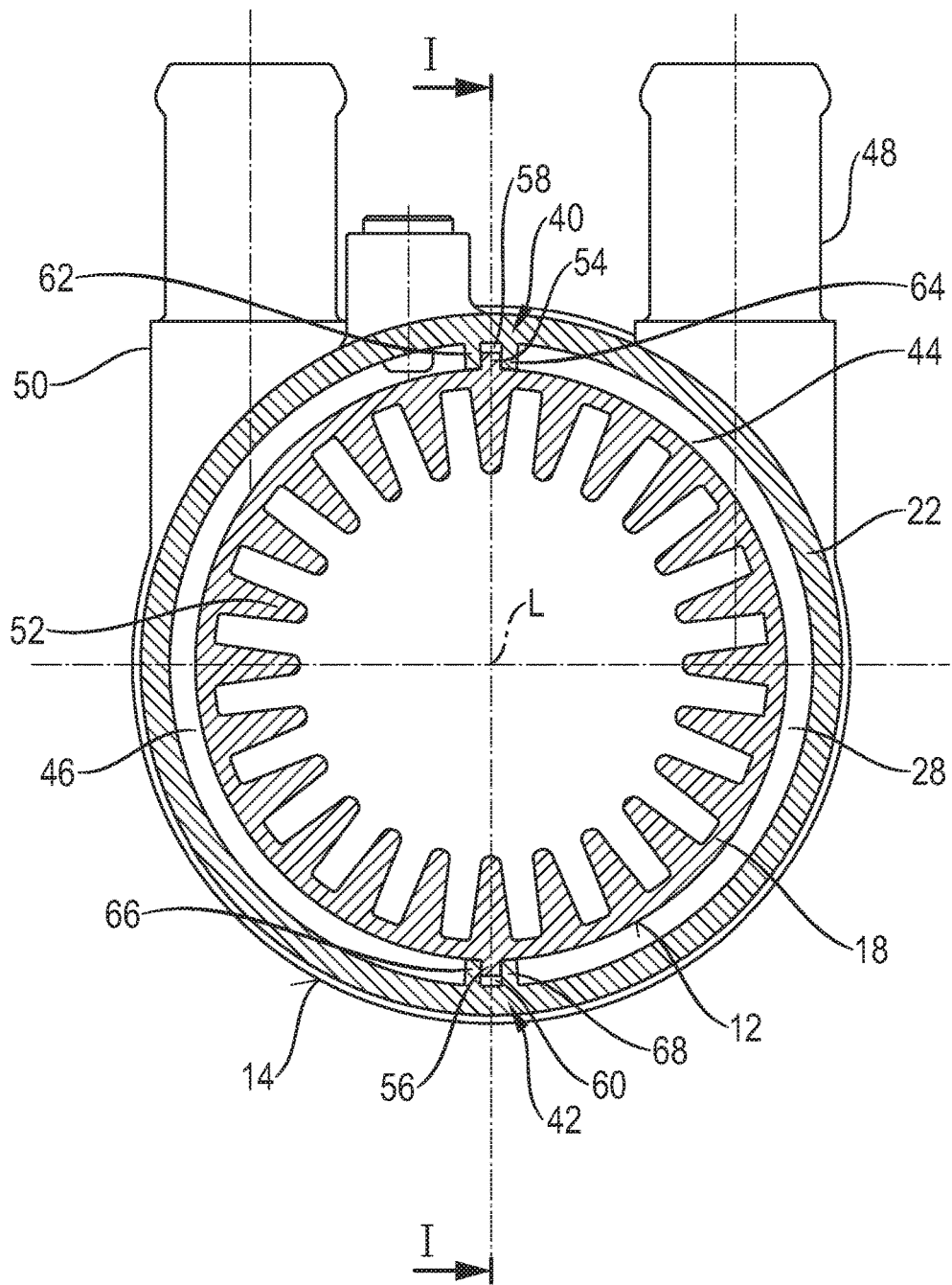
FIG. 2 is a cross-sectional view of the heat exchanger arrangement shown in FIG. 1, cut along a line II-II in FIG. 1.
Figure 3:
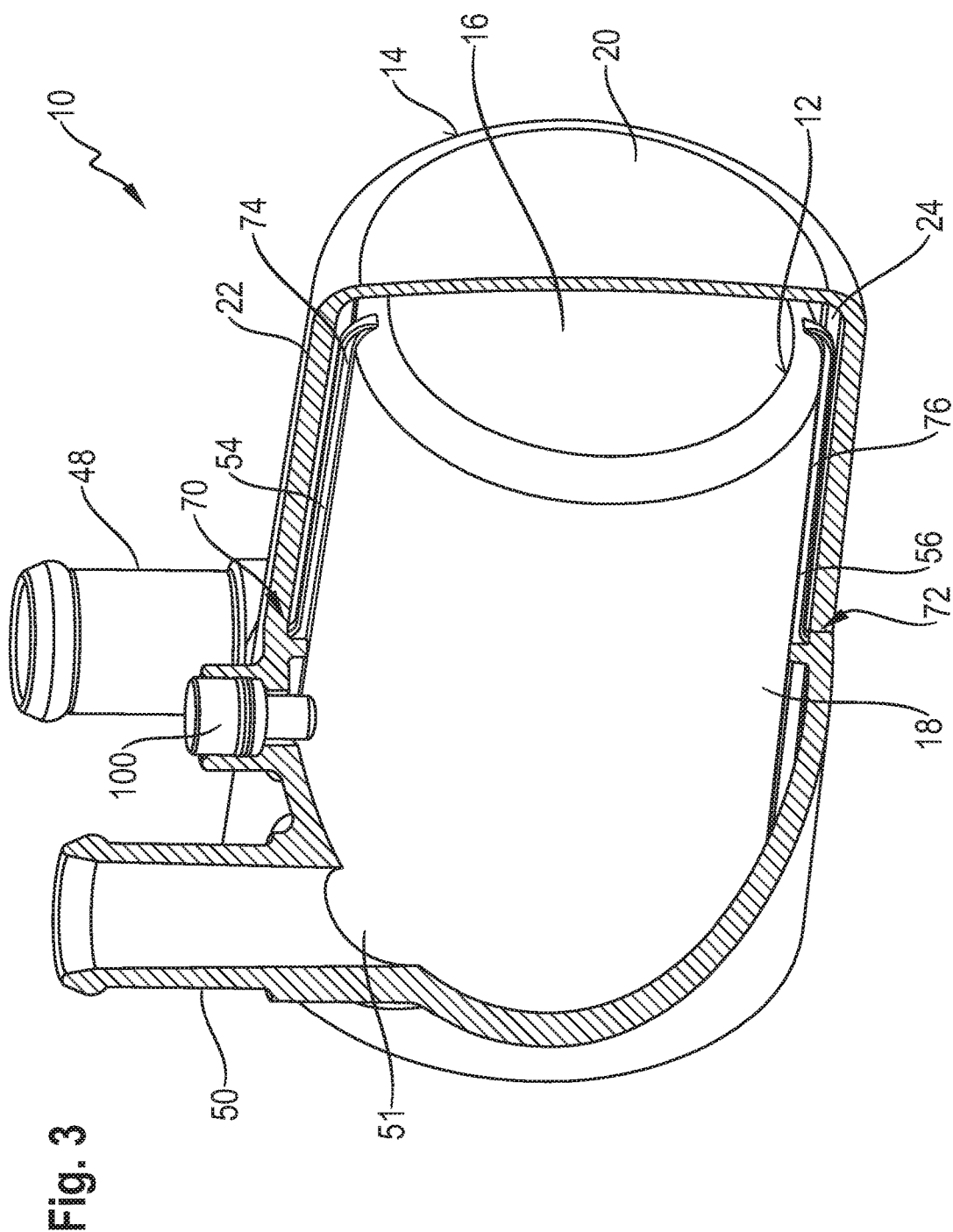
FIG. 3 is a perspective view of the heat exchanger arrangement with an outer heat exchanger housing shown as a partially cut-away view.

It can be clearly recognized in FIGS. 1 and 4 that the two first webs 54, 56 of the flow guiding formations 40, 42 are designed such that their radial projection height changes, e.g., stepwise over the outer circumferential surface of the first circumferential wall 18 in a transition area 70, 72.

In a respective section 74 and 76 of the respective first webs 54 and 56, which section extends along the circumferential wall 18 from the adjoining area 30 to the transition area 70 and 72, respectively, these webs have a smaller, preferably essentially constant projection height, than in a respective section 78 and 80 extending from the respective transition area 70 and 72. This leads to a configuration in which the sections 78, 80 are in contact with a corresponding recess bottom surface 86, 88 of the recesses 58, 60 receiving the first webs 54, 56 with a press fit in the assembled state with the radially outwardly oriented end faces 82 and 84, respectively. The radially outwardly oriented end faces 82, 84 formed on the first webs 54, 56 now provide respective first press fit formation surfaces 90, 92 of a press fit formation generally designated by 94, while the radially inwardly oriented recess bottom surfaces 86, 88 provide respective second press fit formation surfaces 96, 98 of the press fit formation 94.

The sections 78, 80 of the first webs 54, 56 extend essentially in the end area 32 or extend starting from an area at or close to the axial end of the first circumferential wall 16 in the direction of the adjoining area 30 or the first bottom area 16. The sections 78, 80 advantageously assume a longitudinal extension with a component in the range of 0.2 to 0.6 and preferably about 0.4 of the length of axial extension of the first circumferential wall 18. This means that the sections 78, 80 and with these the press fit formations 94 provided by the two flow guiding formations 40, 42 as well extend into a middle area of the circumferential walls 18, 22, i.e., into an axially middle area of the entire heat exchanger arrangement 10. In the area of the sections 74, 76, the end faces of the webs 54, 56 are located at a radially spaced location from the recess bottom surfaces on the second circumferential wall 22, so that the two heat exchanger housings 12, 14 are located at spaced locations from one another in between the press fit formation 94, which is essentially limited axially, on the transition areas 70, 72, and the adjoining area 30. It is thus guaranteed that the area of the mutual fixation is axially limited and redundancy in the mutual positioning of the two housing parts 12, 14 can be avoided. A defined and stable relative positioning, which avoids an excessive local load or excessively low load of the sealing elements 34, is likewise avoided especially in the areas in which the two heat exchanger housings 12, 14 are sealed against one another by the sealing element 34. The two heat exchanger housings 12, 14 can likewise be integrated with the sealing element 34 in a simple manner to form a preassembled assembly unit.

With reference to FIG. 6, an alternative embodiment of the press fit formation 94 will be explained below on the basis of the first flow guiding formation 40 shown as an example in FIG. 6. It is obvious that the second flow guiding formation may also be designed in a corresponding manner. The basic design of the heat exchanger arrangement with its two heat exchanger housings corresponds to the design described in detail above.

In the first flow guiding formation 40 shown in FIG. 6, the press fit formation 94 comprises lateral web surfaces 100, 102, which are oriented in the circumferential direction in its section 78, i.e., upwardly and downwardly in the view shown in FIG. 6, which said surfaces provide respective first press fit surfaces 104, 106 of the press fit formation. Lateral recess surfaces 108, 110 of the recess 58 formed between the two second webs 62, 64 are positioned opposite the two lateral web surfaces 100, 102 in the circumferential direction. The lateral recess surface 110 is a lateral web surface of the second web 62. The lateral recess surface 108 is a lateral web surface of the second web 64. The lateral recess surfaces 108, 110 provide respective second press fit surfaces 112, 114 of the press fit formation 94.

Adjoining the section 78, the first web 54 tapers in a ramp-like or step-like transition area 70 and then extends with its section 74 along the second webs 62, 64 located in a circumferentially spaced location from this section 74 in the direction of the adjoining area 30.

By providing the two sections 78, 74, it is ensured in this embodiment as well that the length of the press fit formation 94 between the end area 32 and the adjoining area 30 is limited to the area in which the fluid enters the heat exchanger arrangement 10 and leaves same and in which a mutual sealing of the two heat exchanger housings in relation to one another is also provided. Provisions may be made here as well for the length of the press fit formation 94 to be in the range of 0.2 to 0.6 and preferably about 0.4 of the length of axial extension of the first circumferential wall 18.

The width of the first web 54, i.e., the circumferential extension thereof, is coordinated in section 78 with the width of the recess 58, i.e., the mutual distance between the two second webs 62, 64, such that when the two heat exchanger housings 12, 14 are pushed axially one into another, the first press fit surfaces 104, 106 and the second press fit surfaces 112, 114 are pressed against one another and thus bring about stable holding of the two heat exchanger housings on one another, but pushing into one another is made, in principle, possible. In particular, provisions could now be made, for example, for the first press fit surfaces 104, 106 to be located in a wedge-shaped pattern in relation to one another, i.e., with increasing mutual distance towards the end area 32, while the two second press fit surfaces 112, 114 are located essentially in parallel to one another, i.e., they have a constant distance in the direction of the recess 58. As an alternative, the two second press fit surfaces 112, 114 could also have an increasing distance from one another towards the end area 32, so that the recess 58 is also widened in a wedge-shaped pattern towards the end area 32.

By generating a press fit acting in the circumferential direction, radial expansion of the outer heat exchanger housing 14 in the area of the second circumferential wall 22 thereof during the generation of the press fit, i.e., basically a deformation, is avoided. A deformation of the inner heat exchanger housing 12 that may possibly occur in the area of the first circumferential wall 18 thereof in the radially inwardly direction during the generation of the press fit is correspondingly avoided as well. Such deformations could compromise the sealing functionality of the sealing element 34. This makes it possible to generate a very rigidly acting press fit in the embodiment variant shown in FIG. 6.

The above-described embodiments of a heat exchanger arrangement merge various aspects which are already especially advantageous in themselves. On the one hand, functions are merged due to the fact that the flow guiding formations also provide the press fit formation, and this makes it possible to design the two heat exchanger housings in other areas in an optimized manner in respect to relevant aspects, e.g., the local flow guiding and heat transfer, without also having to take other functionalities, for example, the generation of the press fit, into consideration. On the other hand, the generation of the press fit in the end area of the circumferential walls, i.e., at a spaced location from the respective bottom walls of the housing parts, makes it possible to achieve the defined positioning where a defined relative positioning of the two housings is especially important, namely where the sealing effect is also achieved. Furthermore, the press fit formation provided by the flow guiding formations prevents any fluid leakage between the two partial flow spaces especially in the axial area, in which fluid enters and leaves the fluid flow space. This also ensures that a temperature sensor 100 provided on the outer heat exchanger housing 14 and protruding into the second partial flow space 46 can detect exactly the temperature that the fluid being thermally treated in the heat exchanger arrangement 10 has in the area of the outlet opening 51. Where such a fluid leakage, which is likewise to be avoided, in principle, is less critical concerning the reduction of thermal efficiency, namely, closer to the area in which the circumferential walls adjoin the respective bottom walls, reliable separation of the two partial flow spaces is likewise ensured by the first webs meshing with the recesses while generating the labyrinth-like sealing effect mentioned.

Even though the above-mentioned positioning of the two flow guiding formations, which can be clearly recognized in the figures, with an angular distance of 180° in relation to the longitudinal axis L is especially advantageous based on a uniform heat absorption characteristic, these formations could also be arranged such that the two partial flow spaces 44, 46 have different sizes compared to one another, i.e., the two flow guiding formations have an angular distance of less than or greater than 180° in relation to one another. It shall also be noted that, even though not shown in the figures, flow guiding ribs may be provided on the two heat exchanger housings 12 or/and 14 and the surfaces thereof that face the fluid flow space 24 in order to guide the fluid flowing in the fluid flow space 24 into areas intended therefor in a defined manner, the fact that the flow guiding formations and their first webs and the recesses receiving these also extend essentially over the entire length of the circumferential walls in the direction of the longitudinal axis L is also especially advantageous concerning the flow guiding. However, for example, the first webs could end, in principle, already in front of the adjoining area, i.e., at a short distance from the first bottom wall. This also means in the sense of the present invention that they extend over the essential length of extension of the heat exchanger housings and the circumferential walls.

Furthermore, it shall be noted that the flow guiding formations may also be provided, for example, with a circumferential extension component and may extend, for example, wound helically about the longitudinal axis L. The first webs can then be inserted into the recesses receiving same by a relative axial motion and a relative rotary motion in the manner of establishing a screw connection. Such an extension can also be interpreted in the sense of the present invention as an extension of the flow guiding formations essentially in the direction of the longitudinal axis L. However, the essentially straight extension, as it is shown in the figures, is especially advantageous for production-technical reasons and also for reasons of simple design. The radial orientation of end faces and bottom surfaces mentioned with reference to the embodiment according to FIGS. 1 through 5 should not, of course, be defined in the sense of the present invention only such that these must be curved surfaces with an exactly radially oriented surface normal. An embodiment of the surface in question with essentially radially oriented surface normal, especially also non-curved surfaces, are also covered here in the sense of the present invention. This also applies to the lateral web surfaces and lateral recess surfaces according to FIG. 6. These surfaces also do not have to extend exactly along radial lines, but may also be located, for example, in parallel to a radial plane intersecting the longitudinal axis L and may be designed as curved or non-curved surfaces.

It would, of course, also be possible in a heat exchanger arrangement designed according to the present invention to make provisions for one of the flow guiding formations to have the design shown in FIG. 6, i.e., with generation of a press fit acting in the circumferential direction, while the other flow guiding formation is designed with the design shown in FIGS. 1 through 5, i.e., with generation of a press fit acting in the radial direction. Regardless of which or how many of the flow guiding formations are formed with the design according to FIG. 6 or the design according to FIGS. 1 through 5, provisions could, furthermore, be made for one or both of the flow guiding formations to be designed with a first web on the outer heat exchanger housing and a recess or with second webs associated with the first web on the inner heat exchanger housing.

The embodiment recognizable especially in FIG. 1, in which the two circumferential walls are flush with their axial ends, i.e., in which they also provide end faces staggered radially and flush with one another in the circumferential walls, is likewise advantageous for obtaining a design that can be embodied in a simple manner. It shall also be noted that the circumferential walls may also be provided such as disclosed in DE 101 43 479 C1 cited in the introduction. This means that, adjoining the axial end of the circumferential wall of the inner heat exchanger housing, a ring-shaped wall area, which surrounds the circumferential wall radially on the outside and can be positioned adjoining the circumferential wall provided on the outer heat exchanger housing or the axial end of said wall and can thus also be closed in a fluid-tight manner by the sealing element and which ultimately defines the fluid flow space radially outwardly together with the circumferential wall of the outer heat exchanger housing, could be connected on the inner heat exchanger housing.

While specific embodiments of the invention have been shown and described in detail to illustrate the application of the principles of the invention, it will be understood that the invention may be embodied otherwise without departing from such principles.

The invention claimed is:

1. A heat exchanger arrangement, for a vehicle heater, the heat exchanger arrangement comprising:
   a pot-shaped inner heat exchanger housing with a first bottom wall and with a first circumferential wall adjoining the first bottom wall and surrounding a longitudinal axis;
   a pot-shaped outer heat exchanger housing with a second bottom wall and with a second circumferential wall adjoining the second bottom wall and surrounding the longitudinal axis;
   a fluid flow space formed between the inner heat exchanger housing and the outer heat exchanger housing;
   a first flow guiding formation extending essentially in the direction of the longitudinal axis along the first circumferential wall and the second circumferential wall and a second flow guiding formation extending essentially in the direction of the longitudinal axis along the first circumferential wall and the second circumferential wall at a circumferentially spaced location from the first flow guiding formation, wherein the first flow guiding formation and the second flow guiding formation divide a part of the fluid flow space formed between the first circumferential wall and the second circumferential wall into a first partial flow space and a second partial flow space;
   at least one fluid inlet opening open towards the fluid flow space in a circumferential area of the first partial flow space and at least one fluid outlet opening open towards the fluid flow space in a circumferential area of the second partial flow space; and
   a press fit formation for fixing the inner heat exchanger housing in relation to the outer heat exchanger housing, the press fit formation provided in an end area of the circumferential walls located at a distance from the first bottom wall and the second bottom wall and the press fit formation comprising at least one of the first flow guiding formation and the second flow guiding formation, wherein the press fit formation on at least one of the first flow guiding formation and the second flow guiding formation comprises a radially outwardly oriented first press fit surface and a radially inwardly oriented second press fit formation surface pressed against the first press fit surface, at least one of the first flow guiding formation and the second flow guiding formation comprising at least one radially projecting first web on one circumferential wall from among the first circumferential wall and the second circumferential wall and a recess receiving the at least one first web on another circumferential wall from among the first circumferential wall and the second circumferential wall, the first web having a radially oriented end face providing a press fit surface of the first press fit surface and the second press fit formation surface and the recess having a radially oriented recess bottom surface providing another press fit surface of the first press fit surface and the second press fit formation surface, wherein the end faces of the at least one first web are located at a radially spaced location from the associated recess bottom surface in a length area of the at least one flow guiding formation adjoining the press fit formation.

2. A heat exchanger arrangement in accordance with claim 1, further comprising a sealing formation, the fluid flow space being closed in a fluid-tight manner in the end area by the sealing formation acting between the inner heat exchanger housing and the outer heat exchanger housing, the end area being located at an axial end area of the circumferential walls, the axial end area being located at an axially spaced location from the first bottom wall and the second bottom wall with respect to the longitudinal axis.

3. A heat exchanger arrangement in accordance with claim 1, wherein the press fit formation has a length of extension in the direction of the longitudinal axis in the range of 0.2 to 0.6 of a length of extension of the first circumferential wall in the direction of the longitudinal axis.

4. A heat exchanger arrangement in accordance with claim 1, wherein the recess is formed between two second webs projecting radially from the other circumferential wall at a circumferentially spaced location from one another.

5. A heat exchanger arrangement in accordance with claim 1, wherein the first circumferential wall is one circumferential wall and that the second circumferential wall is the other circumferential wall.

6. A heat exchanger arrangement in accordance with claim 1, wherein a recess width corresponds, in at least some areas, essentially to a web width of the first web meshing with this recess.

7. A heat exchanger arrangement in accordance with claim 1, wherein the length area extends to the bottom walls starting from the press fit formation to an area in which the circumferential walls adjoin the bottom walls.

8. A heat exchanger arrangement in accordance with claim 1, wherein the press fit formation has a length of extension in the direction of the longitudinal axis of about 0.4 of a length of extension of the first circumferential wall in the direction of the longitudinal axis.

9. A vehicle heater, comprising a burner area to be supplied with combustion air and fuel and a heat exchanger arrangement comprising:
  a pot-shaped inner heat exchanger housing with a first bottom wall and with a first circumferential wall adjoining the first bottom wall and surrounding a longitudinal axis;
  a pot-shaped outer heat exchanger housing with a second bottom wall and with a second circumferential wall adjoining the second bottom wall and surrounding the longitudinal axis;
  a fluid flow space formed between the inner heat exchanger housing and the outer heat exchanger housing;
  a first flow guiding formation extending essentially in the direction of the longitudinal axis along the first circumferential wall and the second circumferential wall and a second flow guiding formation extending essentially in the direction of the longitudinal axis along the first circumferential wall and the second circumferential wall at a circumferentially spaced location from the first flow guiding formation, wherein the first flow guiding formation and the second flow guiding formation divide a part of the fluid flow space formed between the first circumferential wall and the second circumferential wall into a first partial flow space and a second partial flow space;
  at least one fluid inlet opening, open towards the fluid flow space in a circumferential area of the first partial flow space, and at least one fluid outlet opening, open towards the fluid flow space in a circumferential area of the second partial flow space; and
  a press fit formation for fixing the inner heat exchanger housing in relation to the outer heat exchanger housing, the press fit formation comprising at least one of the first flow guiding formation and the second flow guiding formation in an end area of the circumferential walls located at a distance from the first bottom wall and the second bottom wall, the heat exchanger arrangement transferring combustion heat generated in the burner area to a fluid flowing through the fluid flow space, wherein the press fit formation on at least one of the first flow guiding formation and the second flow guiding formation comprises a radially outwardly oriented first press fit surface and a radially inwardly oriented second press fit formation surface pressed against the first press fit surface, at least one of the first flow guiding formation and the second flow guiding formation comprising at least one radially projecting first web on one circumferential wall from among the first circumferential wall and the second circumferential wall and a recess receiving the at least one first web on another circumferential wall from among the first circumferential wall and the second circumferential wall, the first web having a radially oriented end face providing a press fit surface of the first press fit surface and the second press fit formation surface and the recess having a radially oriented recess bottom surface providing another press fit surface of the first press fit surface and the second press fit formation surface, wherein the end faces of the at least one first web are located at a radially spaced location from the associated recess bottom surface in a length area of the at least one flow guiding formation adjoining the press fit formation.

10. A vehicle heater in accordance with claim 9, further comprising a sealing formation, the fluid flow space being closed in a fluid-tight manner in the end area by the sealing formation acting between the inner heat exchanger housing and the outer heat exchanger housing.

11. A vehicle heater in accordance with claim 9, wherein the press fit formation has a length of extension in the direction of the longitudinal axis in the range of 0.2 to 0.6 of a length of extension of the first circumferential wall in the direction of the longitudinal axis.

12. A heat exchanger arrangement, for a vehicle heater, the heat exchanger arrangement comprising:
  a pot-shaped inner heat exchanger housing with a first bottom wall and with a first circumferential wall adjoining the first bottom wall and surrounding a longitudinal axis;

a pot-shaped outer heat exchanger housing with a second bottom wall and with a second circumferential wall adjoining the second bottom wall and surrounding the longitudinal axis;

a fluid flow space formed between the inner heat exchanger housing and the outer heat exchanger housing;

a first flow guiding formation extending essentially in the direction of the longitudinal axis along the first circumferential wall and the second circumferential wall and a second flow guiding formation extending essentially in the direction of the longitudinal axis along the first circumferential wall and the second circumferential wall at a circumferentially spaced location from the first flow guiding formation, wherein the first flow guiding formation and the second flow guiding formation divide a part of the fluid flow space formed between the first circumferential wall and the second circumferential wall into a first partial flow space and a second partial flow space;

at least one fluid inlet opening open towards the fluid flow space in a circumferential area of the first partial flow space and at least one fluid outlet opening open towards the fluid flow space in a circumferential area of the second partial flow space; and a press fit formation for fixing the inner heat exchanger housing in relation to the outer heat exchanger housing, the press fit formation provided in an end area of the circumferential walls located at a distance from the first bottom wall and the second bottom wall and the press fit formation comprising at least one of the first flow guiding formation and the second flow guiding formation, wherein the press fit formation on at least one of the first flow guiding formation and the second flow guiding formation comprises at least one first press fit surface oriented in a first circumferential direction and at least one second press fit surface oriented in a second circumferential direction opposite the first circumferential direction and pressed against the at least one first press fit surface, at least one of the first flow guiding formation and the second flow guiding formation comprising at least one radially projecting first web on one circumferential wall from among the first circumferential wall and the second circumferential wall and a recess receiving the at least one first web on another circumferential wall from among the first circumferential wall and the second circumferential wall, the first web having lateral web surfaces providing first press fit surfaces and the recess has lateral recess surfaces oriented in the circumferential direction providing second press fit surfaces, wherein in a length area of at least one of the first flow guiding formation and the second flow guiding formation adjoining the press fit formation, the lateral web surfaces are located at a circumferentially spaced location from the associated lateral recess surfaces.

13. A heat exchanger arrangement in accordance with claim 12, further comprising a sealing formation, the fluid flow space being closed in a fluid-tight manner in the end area by the sealing formation acting between the inner heat exchanger housing and the outer heat exchanger housing, the end area being located at an axial end area of the circumferential walls, the axial end area being located at an axially spaced location from the first bottom wall and the second bottom wall with respect to the longitudinal axis.

14. A heat exchanger arrangement in accordance with claim 12, wherein the press fit formation has a length of extension in the direction of the longitudinal axis in the range of 0.2 to 0.6 of a length of extension of the first circumferential wall in the direction of the longitudinal axis.

15. A heat exchanger arrangement in accordance with claim 12, wherein the recess is formed between two second webs projecting radially from the other circumferential wall at a circumferentially spaced location from one another.

16. A heat exchanger arrangement in accordance with claim 12, wherein the first circumferential wall is one circumferential wall and that the second circumferential wall is the other circumferential wall.

17. A heat exchanger arrangement in accordance with claim 12, wherein a recess width corresponds, in at least some areas, essentially to a web width of the first web meshing with this recess.

18. A vehicle heater, comprising a burner area to be supplied with combustion air and fuel and a heat exchanger arrangement comprising:

a pot-shaped inner heat exchanger housing with a first bottom wall and with a first circumferential wall adjoining the first bottom wall and surrounding a longitudinal axis;

a pot-shaped outer heat exchanger housing with a second bottom wall and with a second circumferential wall adjoining the second bottom wall and surrounding the longitudinal axis;

a fluid flow space formed between the inner heat exchanger housing and the outer heat exchanger housing;

a first flow guiding formation extending essentially in the direction of the longitudinal axis along the first circumferential wall and the second circumferential wall and a second flow guiding formation extending essentially in the direction of the longitudinal axis along the first circumferential wall and the second circumferential wall at a circumferentially spaced location from the first flow guiding formation, wherein the first flow guiding formation and the second flow guiding formation divide a part of the fluid flow space formed between the first circumferential wall and the second circumferential wall into a first partial flow space and a second partial flow space;

at least one fluid inlet opening, open towards the fluid flow space in a circumferential area of the first partial flow space, and at least one fluid outlet opening, open towards the fluid flow space in a circumferential area of the second partial flow space; and a press fit formation for fixing the inner heat exchanger housing in relation to the outer heat exchanger housing, the press fit formation comprising at least one of the first flow guiding formation and the second flow guiding formation in an end area of the circumferential walls located at a distance from the first bottom wall and the second bottom wall, the heat exchanger arrangement transferring combustion heat generated in the burner area to a fluid flowing through the fluid flow space, wherein the press fit formation on at least one of the first flow guiding formation and the second flow guiding formation comprises at least one first press fit surface oriented in a first circumferential direction and at least one second press fit surface oriented in a second circumferential direction opposite the first circumferential direction and pressed against the at least one first press fit surface, at least one of the first flow guiding formation and the second flow guiding formation comprising at least one radially projecting first web on one circumferential wall from among the first circumferential wall and the second circumferential wall and a recess receiving the at least one first web on another circumferential wall from among the first circumferential wall and the second circumferential wall, the first web having lateral web surfaces providing first press fit surfaces and the recess has lateral recess surfaces oriented in the circumferential direction providing second press fit surfaces, wherein in a length area of at least one of the first flow guiding formation and the second flow guiding formation adjoining the press fit formation, the lateral web surfaces are located at a circumferentially spaced location from the associated lateral recess surfaces.

19. A vehicle heater in accordance with claim 18, further comprising a sealing formation, the fluid flow space being closed in a fluid-tight manner in the end area by the sealing formation acting between the inner heat exchanger housing and the outer heat exchanger housing.

20. A vehicle heater in accordance with claim 18, wherein the press fit formation has a length of extension in the direction of the longitudinal axis in the range of 0.2 to 0.6 of a length of extension of the first circumferential wall in the direction of the longitudinal axis.

21. A heat exchanger arrangement in accordance with claim 12, wherein the length area extends to the bottom walls starting from the press fit formation to an area in which the circumferential walls adjoin the bottom walls.

* * * * *